Aug. 27, 1963   J. E. FLEMING   3,101,969
TRUCK TRAILER DECKING MOUNTING MEANS
Filed Dec. 26, 1961   2 Sheets-Sheet 1
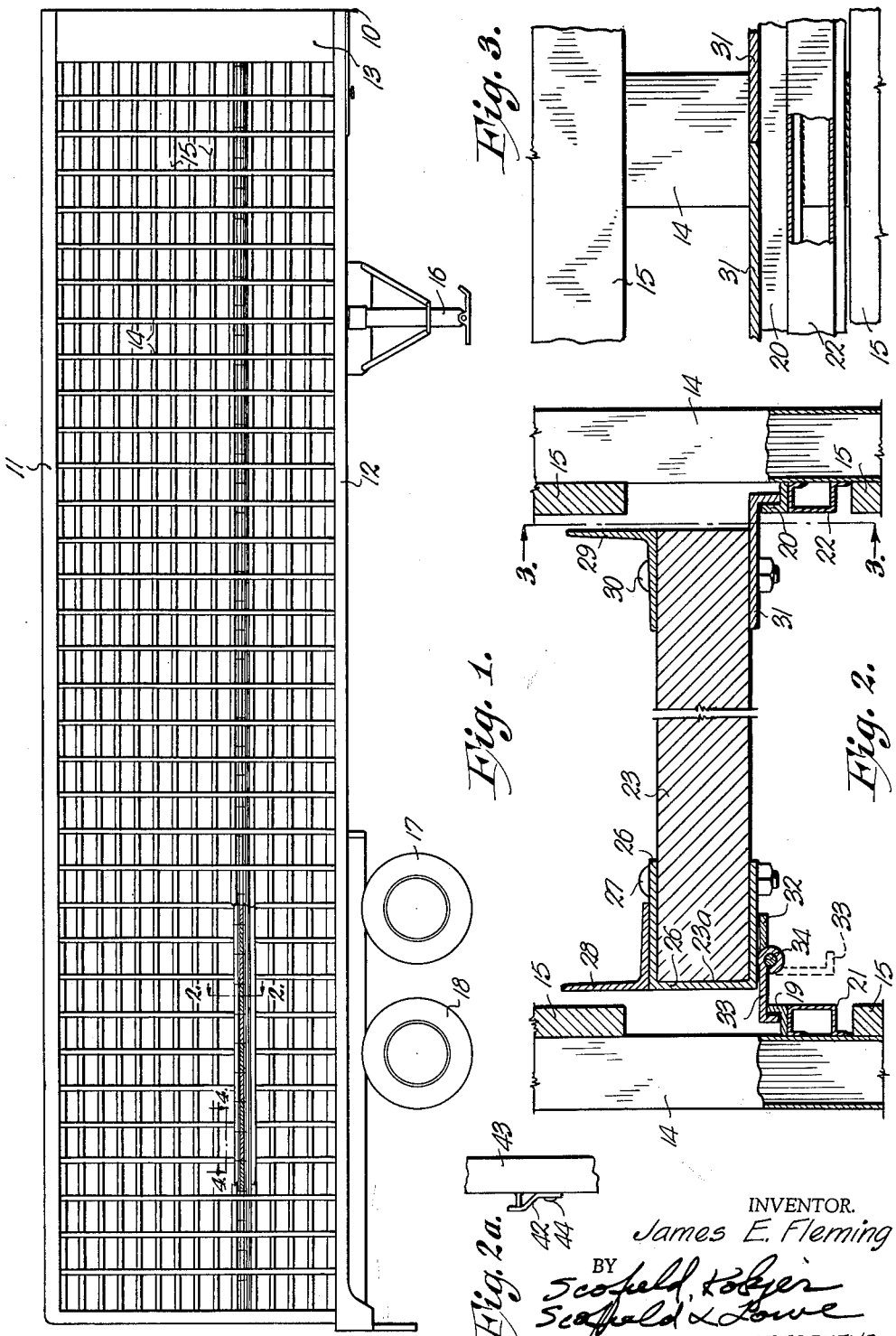
INVENTOR.
James E. Fleming
BY
Scofield, Kolyer
Scofield & Lowe
ATTORNEYS.

Aug. 27, 1963    J. E. FLEMING    3,101,969
TRUCK TRAILER DECKING MOUNTING MEANS
Filed Dec. 26, 1961    2 Sheets-Sheet 2
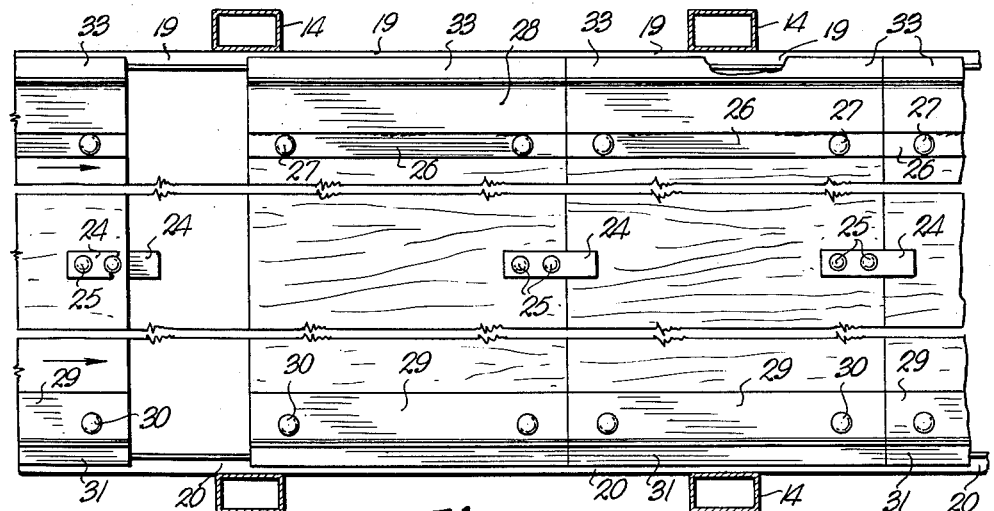
Fig. 4.
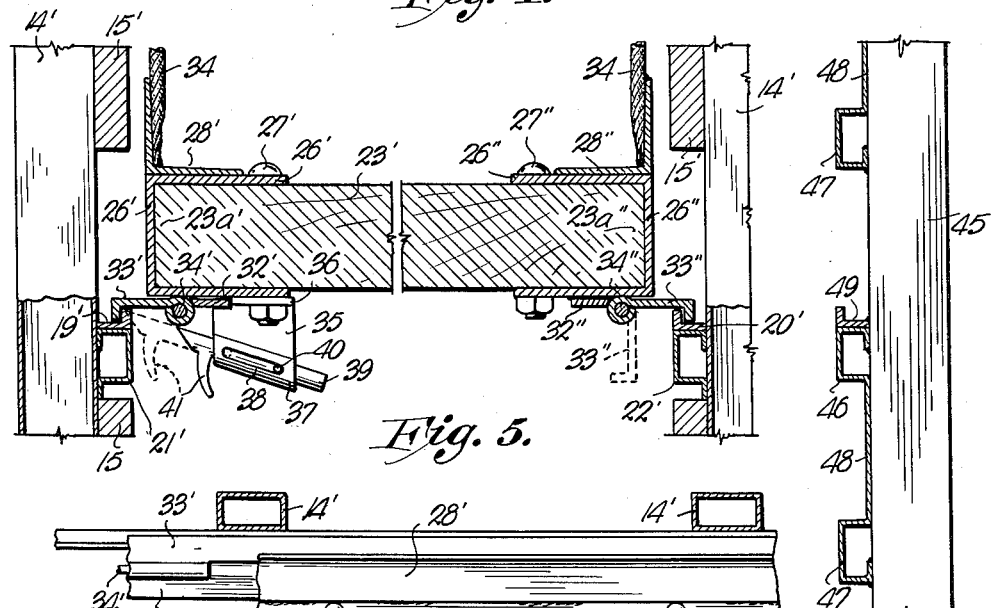
Fig. 5.
Fig. 7.
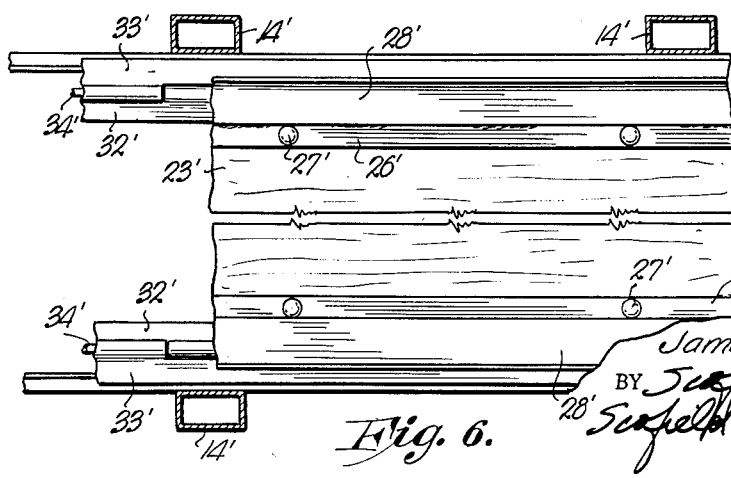
Fig. 6.
INVENTOR.
James E. Fleming
BY
ATTORNEYS.

United States Patent Office 3,101,969
Patented Aug. 27, 1963

3,101,969
TRUCK TRAILER DECKING MOUNTING MEANS
James E. Fleming, Russellville, Tex., assignor of one-half to Thomas Boyce, Nashville, Tenn.
Filed Dec. 26, 1961, Ser. No. 162,113
5 Claims. (Cl. 296—24)

This invention relates to truck trailers for the transport of livestock and refers more particularly to decking in said trailers for multilevel livestock transport in said trailers.

Transportation of livestock is one of the most important phases of the trucking industry. Special truck trailer livestock vans have been developed to transport the various types of livestock. In the transportation of hogs and sheep, livestock of considerably lesser height than cattle, it is common to employ a plurality of decks in the livestock trailer in order to accommodate more animals in the van. A common system is to provide permanent deck receiving rails running horizontally on the vertical side walls of the trailer. Such deck rails conventionally comprise a shelf or platform to receive the livestock deck flooring with an overlying shelf or platform to retain same in place and guide insertion thereof. When not in use, such decks are generally stored in the top of the van.

However, there are a number of problems encountered in the industry with the conventionally available deck mounting and handling systems in livestock trailers. The general problem is provision of effective methods of and means for mounting the decks at the various levels in the trailer. The adequate and secure anchoring of the livestock decking is a specific problem in the art, particularly with substantial in and out movement of the trailer sides possible due to the conventional type of trailer side wall construction, the considerable weight of the animals, etc. Further, vertical ventilation through the trailer is considerably hampered by conventional deck rails which block flow of air vertically up and down the sides of the trailer. It is also desirable to protect the animals' feet and prevent their feet and legs from being caught between the decks and the side walls of the livestock trailer. This is not accomplished in a satisfactory manner in many deck rail constructions. Another objection to conventional deck support systems lies in their excessive space occupancy which decreases the available width within the trailer. It would be very desirable to be able to provide any desired deck height which is not possible with conventional deck rails and other systems. It would also be desirable to provide a roll-up deck which would be readily and strongly engageable with the side supports at any desired height, yet readily disengaged therefrom for removal to top storage again.

Therefore, an object of the invention is to provide means for effectively mounting a plurality of livestock carrying decks in a livestock trailer.

Another object of the invention is to provide means for adequately and securely anchoring livestock decking in a livestock trailer.

Another object of the invention is to provide livestock decking which is so mounted on and secured to the side walls of the trailer as to prevent any substantial in and out movement of the trailer sides.

Another object of the invention is to provide livestock trailer decking which does not hamper in any material way vertical flow of air in the trailer up and down the side walls of the trailer.

Another object of the invention is to provide livestock trailer decking mounting means which protect the animals' feet and prevent their feet and legs from being caught between the deck side edges and the side walls of the trailer.

Another object of the invention is to provide means for mounting livestock receiving decks in livestock trailers which do not take up floor space or decrease the available width for animals within the trailer.

Another object of the invention is to provide livestock deck mounting means which permit the mounting of decks at substantially any desired height within the trailer.

Still another object of the invention is to provide a roll-up or cable suspended deck which is readily and strongly engageable with the side wall supports at any desired height, yet which may be readily disengaged therefrom for removal to top storage.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

FIG. 1 is a side view of a livestock carrying trailer with a portion thereof cut away to show a livestock receiving deck mounted therein.

FIG. 2 is a view taken along the line 2—2 of FIG. 1 in the direction of the arrows.

FIG. 2a is a fragmentary view like that of one side of FIG. 2 showing a decking mounting member fixed to the inside wall of a smooth walled trailer.

FIG. 3 is a view taken along the line 3—3 of FIG. 2 in the direction of the arrows.

FIG. 4 is a view taken along the line 4—4 of FIG. 1 in the direction of the arrows.

FIG. 5 is a view similar to that of FIG. 2 but showing a modified mounting and releasing means for the deck.

FIG. 6 is a view similar to that of FIG. 4 but of the mounting means and deck of FIG. 5, parts cut away to better illustrate the invention.

FIG. 7 is a fragmentary view from the end of a side wall of a trailer showing a multi-level mounting thereon.

Referring to FIG. 1, at 10 is generally designated a livestock van or trailer adapted to receive and transport livestock of various types. The van or trailer has a top wall or roof cap 11 spaced vertically from floor or deck 12 by a pair of vertically extending side walls generally designated 13. Side walls 13 generally have the major portion of their extent made up of vertical tubes 14 spaced from one another and connected to elongate horizontal side slats or bars 15. Front supports 16 are retactable when the trailer is in use. Rear wheels 17 and 18 are received upon conventional axle systems.

All of the above is conventional and may be varied considerably in details of construction.

The decking construction of FIGS. 2-4 will be first described as applied in a trailer as seen in FIG. 1. At least one elongate first member 19 or 20, L-shaped in transverse cross section, is provided on each vehicle side wall, so attached to the side wall as to form an upwardly opening trough therewith. To the left in FIG. 2 is seen L-shaped first member 19 and to the right in the same view is seen L-shaped first member 20. The vertical flange of member 19 is of lesser height than the vertical flange of member 20 as will be described. The said first members may be supported by and attached to any suitable means such as continuous elongate channels 21 and 22 which are fixed to the vertical tubes 14 of the vehicle wall sides In the case of a slat sided truck trailer as seen in FIGS 1–4, inclusive, the elongate first members 19 and 20 are positioned between horizontal slats or beams and run parallel thereto.

The livestock receiving decking seen in FIGS. 1–4 is formed of a plurality of rectangular wooden or extruded aluminum sections 23 having parallel longitudinal edges and end edges. Sections 23 are fastenable together by metal leaves 24 which are fixed to the upper and lower surfaces of sections 23 by suitable bolts 25 slidably and are engageable and disengageable with the adjacent decking. The pairs of leaves 24 engage the upper and lower surfaces of the adjacent deck section to prevent up and down movement of the sections relative to one another. An elongate C-shaped (in transverse cross section) piece 26 engages one side edge 23a of the decking sections 23 and is fixed thereto by bolts 27. Fastened to the top surface of member 26 is a member 28, L-shaped in transverse cross section, which runs the length of the decking section 23 on which it mounted. Member 28 has one leg of the L extending vertically, parallel to the outside edge 23a of the decking, with the other leg fixed to the top surface of member 26. The height of the vertical leg is sufficient to close off the horizontal slot which is above the first mounting member 19. This leg prevents animals getting their feet or legs caught between the decking and the truck sides. Fixed to the opposite longitudinal upper edge of decking 23 is a like longitudinal member 29, also L-shaped in transverse cross section, bolted to the top of decking 23 by bolts 30. The vertical flange of member 29 extends an equal distance upwardly from the top surface of the decking as that of member 28.

Fixed to the under side of the longitudinal edge of the decking 23 which carries on its upper side member 29 is an elongate member 31 L-shaped in transverse cross section. Bolts 30 also fix this member to decking 23. The elongate flange of member 31 fixed to the under side of the decking extends past the edge thereof whereby the downwardly extending leg of member 31 may engage first member 20. At the left side of FIG. 2, fixed to the under side of the decking and the under side of member 26 by suitable means such as welding is one-half 32 of a hinge member. The other half 33 of the hinge member is L-shaped in transverse cross section save in the portion engaging the hinge shaft 34 whereby to be engageable with first member 19 when pivoted to the full line position of FIG. 2 and be free of same when pivoted to the dotted line position of FIG. 2. The clearance of the edges of the assembled decking 23 (as seen in FIG. 2) from horizontal slats 15 must be such (relative to the extension of member 31 past the longitudinal edge of the decking) that, when member 33 is pivoted to the dotted line position of FIG. 2, the decking assemblage will pass upwardly or downwardly between slats 15. In mounting the decking sections in position, they are slid in from the rear end of the trailer as seen in FIG. 4 after members 33 are moved into operating position.

Referring to FIGS. 5 and 6, therein is shown a variation of the decking mounting structure which is particularly adapted to decking supported by cables in the trailer and which is raised to storage and lowered to engagement with the mounting means for use. The cable lift systems in the top of the trailer are not shown as these are conventional.

Turning to the structure of the decking and its mounting means, parts identical in structure to like parts and structures in FIGS. 1-4, inclusive, are numbered the same but primed. Thus, for example, the vertical and horizontal slat structure of the truck trailer wall is the same as the earlier described modification. Secondly, the first members which form an engaging through with the vertical slats are identical and also the mounting means therefor are identical. The latter include parts 19—22. Further, the decking itself, comprising a single elongate rectangular member (both in plan and cross section) is essentially the same as decking elements 23 in the earlier-described modification, but, as it is entirely handled by cable suspension in the trailer, there is no need for a multiplicity of slide-in pieces as seen in FIG. 4. Yet further, the animal feet protecting and deck mounting apparatus shown in the left-hand side of FIG. 5 along the longitudinal edge of the decking is identical to the previously described showing in FIG. 2 with the exception of added parts and devices which will be described.

Along the right-hand edge of the decking 23' in FIG. 5 is mounted an array of supporting and engaging apparatus identical to that on the left-hand edge thereof in the view of FIG. 5. Therefore, said apparatus is numbered the same as the parts on the left-hand side, but double primed. The operations of engagement and disengagement of the elongate hook-type flange members 33' and 33" with first members 19' and 20' is the same as that described relative to FIG. 2 with respect to members 31 and 33 except for the fact that both hook flange members are pivotable to the downwardly-extending position shown in dotted lines in the right-hand side of FIG. 5 (or the left-hand side of FIG. 2) whereby not to require lateral manipulation of the decking 23' relative to the trailer inside walls.

Referring to the new apparatus shown in FIGS. 5 and 6, cables 34 are attached to the vertically extending flanges of members 28' and 28" at intervals therealong whereby to raise and lower the decking 23' into and out of place. Means are additionally provided to push the engaging hook flanges 33' and 33" (only one shown—for 33') from the dotted line position of the right-hand side of FIG. 5 to the full line position thereof from an out of use position to a use position. This means includes a mounting flange 35 which extends normal to the under side of decking 23' but transverse to the longitudinal axis of the decking 23'. Flange 35 is secured by another horizontally oriented flange 36 which is engaged by bolts 27. At the lower end of mounting flange 35 is fixed cylindrical or tubular sleeve 37. Sleeve 37 has a slot 38 formed in one or opposed sides thereof. An elongate actuating bar or rod 39 having a stop lug 40 fixed to the side thereof to fit into slot 38 and also finger grip 41 thereon is positioned in sleeve 37 and is employed to transfer engaging flanges 33' or 33" into operating position from the inoperative position. This avoids the operator having to put his fingers into a danger area should the cable slip or the drop mechanism inadvertently be actuated. Such means may be positioned paired on each side of the under side of the decking 23'. On raising of the decking, when the actuating means have been returned to the full line position of FIG. 5, contact of flanges 33' and 33" with horizontal slats 15' immediately above engagement members 19' and 20' return same to the dotted line position of FIG. 5 or substantially thereto. The clearance between the vertical lengths of members 28' and 28" relative to the side horizontal slats 15' thus need not be as great in this modification as in the case of the FIGS. 1–4 modification.

Referring to FIG. 2a, therein is shown a typical first member mounting means 42 fixed to the inside wall 43 of a smooth walled trailer. Suitable bolts or screws 44 or other means such as welding may be employed to fix the said flange member thereto.

FIG. 7 shows an improved horizontal slat construction for a livestock trailer side wall which permits the installation of flanged first members thereabove whereby to mount livestock deckings at various levels. The trailer side wall includes vertical slats 45 to which are attached elongate slat extrusions comprising upper and lower channels 46 and 47 which are welded or otherwise fixedly attached to the vertical slats. The horizontal slat channels 46 and 47 are joined by a continuous or intermittent flange bridge 48 therebetween. Welded or otherwise fixedly attached to the top of the topmost channel 46 in each case (or in as many cases as desired) is a first member 49 adapted to receive the hook flanges shown best in FIGS. 2 and 5.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. Means for mounting and dismounting decking on the inside faces of the vertical side walls of a truck trailer, comprising, in combination, trough-shaped first members mounted on the inside surface of each side wall of the trailer and running substantially parallel to the trailer floor, a rectangular decking of slightly lesser width than the inside width of the trailer for mounting therein having parallel longitudinal edges and parallel end edges, and trough engaging members fixed to the under side of said decking along each longitudinal edge thereof and extending outwardly thereof and parallel thereto adapted to engage and disengage said first trough members whereby to suspend said decking above the level of said trailer floor, at least one of said trough engaging members pivotally mounted on the underside of said decking, and means on the underside of said decking operative to pivot the pivotable trough engaging member from a nonengaging position at substantial right angles to said decking underside to an engaging position substantially parallel to said decking underside and extending laterally beyond the edge thereof.

2. Means for mounting and dismounting decking on the inside surfaces of the side walls of a truck trailer wherein said side wall interior surfaces having a plurality of elongate, parallel, horizontal slats thereon spaced vertically from one another, comprising, in combination, a first elongate member L-shaped in transverse cross section mounted on the inside surface of each vertical side wall of the trailer between spaced horizontal slats thereon and running substantially parallel to the trailer floor with one leg of the L horizontally oriented and the other vertically oriented, said first member not extending inwardly of the inward extension of said slats, a rectangular decking of slightly lesser width than the inside width of the trailer between opposed slats on said side wall inside surface for mounting therewithin, said decking having parallel longitudinal edges and parallel end edges, at least one second mounting member also L-shaped in transverse cross section fixed to the under side of the said deck along each longitudinal edge thereof and extending outwardly therebeyond and parallel thereto, said mounting members each adapted to engage and disengage a vertical L-leg of a first member on the side wall of the trailer between said slats whereby to support the decking above the trailer floor, at least one of said second members pivotally mounted on the underside of said decking.

3. Means as in claim 2 wherein both said second members are pivotally mounted on the underside of said decking.

4. Means as in claim 2 wherein means are provided on the underside of said decking to pivot said second member from a nonengaging position at substantial right angles to said decking underside to an engaging position substantially parallel to said decking underside and extending laterally beyond the edge thereof.

5. Means as in claim 2 including elongate third members L-shaped in transverse cross section fixed to the upper side of the decking along each longitudinal edge thereof, one leg of the L extending inwardly and flat along the decking, the other leg of the L extending vertically at the edge of the decking a sufficient height to clear the underside of the horizontal side wall slot there above when the decking is in place in the truck trailer whereby to protect the feet of animals to be positioned thereon.

References Cited in the file of this patent
UNITED STATES PATENTS

| | | |
|---|---|---|
| 395,328 | Jewell | Jan. 1, 1889 |
| 777,614 | Ellis | Dec. 13, 1904 |
| 1,205,674 | Shelton | Nov. 21, 1916 |
| 1,826,055 | Cornwall | Oct. 6, 1931 |
| 2,832,636 | Black | Apr. 29, 1958 |
| 2,839,327 | Simpkins | June 17, 1958 |
| 2,841,437 | Turpin | July 1, 1958 |

FOREIGN PATENTS

| | | |
|---|---|---|
| 681,014 | Great Britain | Oct. 15, 1952 |